United States Patent [19]

Reinartz

[11] Patent Number: 4,693,083

[45] Date of Patent: Sep. 15, 1987

[54] VACUUM BRAKE FORCE BOOSTER

[75] Inventor: Hans D. Reinartz, Frankfurt am Main, Fed. Rep. of Germany

[73] Assignee: ITT Industries Incorporated, New York, N.Y.

[21] Appl. No.: 691,426

[22] Filed: Jan. 14, 1985

[30] Foreign Application Priority Data

Jan. 17, 1984 [DE] Fed. Rep. of Germany ....... 3401402

[51] Int. Cl.$^4$ ............................................. B60T 13/00
[52] U.S. Cl. ..................................... 60/547.1; 60/554; 60/562
[58] Field of Search ....................... 60/547.1, 554, 562, 60/553; 91/369 A

[56] References Cited

U.S. PATENT DOCUMENTS

| | | | |
|---|---|---|---|
| 3,321,915 | 5/1967 | Martin | 60/554 |
| 3,422,622 | 1/1969 | Arentoft | 60/562 |
| 3,470,695 | 10/1969 | Kilb | 60/562 |
| 3,473,329 | 10/1969 | Eggstein | 60/553 |
| 3,910,047 | 10/1975 | Grabb | 60/554 |
| 4,033,131 | 7/1977 | Gardner | 60/554 |
| 4,091,619 | 5/1978 | Carré | 60/562 |
| 4,417,445 | 11/1983 | Furuta | 60/554 |

FOREIGN PATENT DOCUMENTS

| | | | |
|---|---|---|---|
| 2129073 | 12/1971 | Fed. Rep. of Germany | 60/562 |
| 39867 | 3/1980 | Japan | 60/562 |

Primary Examiner—Abraham Hershkovitz
Attorney, Agent, or Firm—James B. Raden; Donald J. Breh

[57] ABSTRACT

A vacuum brake force booster is provided wherein the pressure column above the immersing valve plunger of the dual valve contained in the piston chamber, in the applied position, generates a reaction force imparting to the vehicle drive the feeling of the extent of deacceleration. In addition to the valve plunger coupled to the push rod of the brake pedal, the control housing in the piston chamber is displaceable in the brake housing along with the movable wall and acts as a plunger piston. For this purpose, the control housing is sealingly passed through a wall of the master cylinder. The intermediate piston separating the two piston chambers in the master cylinder at the front side thereof facing the valve piston is provided with a rubber reaction disc. The valve plunger and the control housing or a sleeve cooperating with the control housing, in the event of a failure of one of the brake circuits, will abut the reaction disc.

7 Claims, 2 Drawing Figures

VACUUM BRAKE FORCE BOOSTER

BACKGROUND OF THE INVENTION

The present invention is concerned with a vacuum brake force booster comprising a mobile wall sealed against the booster casing and acting upon a control housing. A piston rod is coupled to a brake pedal for operating a dual valve permitting the selective connection of a work chamber of the brake force booster to vacuum or to a higher differential pressure. The dual valve is provided with a valve piston and an intermediate piston axially displaceable in the control housing and has a master cylinder connected to the booster casing for two brake circuits.

In known brake systems such as shown in German Pat. No. 1182539, there is a vacuum booster especially used for operating the brakes of automotive vehicles. The control housing connected to the booster piston and a power transmission element for the master cylinder are movable with respect to one another. Means are provided between the control housing and the power transmission element to transfer the force of the booster piston to the power transmission element and the reactive force to the operator through the control member of the valve means. As a result, a sealed chamber filled with fluid will be formed by the control housing and the power transmission element, with a means being provided on which the pressure prevailing in that chamber is able to exert a reactive force to the valve piston of the valve means.

Such a conventional brake force booster has the disadvantage that the fluid contained in the sealed space cannot be refilled without dissembling the booster in the event that part of the fluid has escaped.

SUMMARY OF THE INVENTION

The present invention provides a vacuum brake force booster which is especially suitable for use with a dual-circuit brake system and in which, upon failure of the brake force booster, the push rod coupled to the brake pedal will act upon a piston the effective cross-sectional area of which is smaller than the piston area acted upon the booster piston. Finally, the booster is space-saving in construction and easy to manufacture.

In accordance with the invention, a valve plunger is coupled to the push road with the end of the plunger facing away from the push rod such that the plunger will immerse into one of the piston chambers of the master cylinder of dual circuit configuration. The piston is floatingly disposed between the two piston chambers and the piston, at the front face thereof facing the valve plunger, is provided with a reaction disc. In the event of a failure of the brake circuit, the reaction disc will abut the front face of the valve plunger and/or the master cylinder-sided front face of the control housing or a sleeve longitudinally displaceable over the control housing and enclosing the valve plunger.

Preferably, a sleeve is disposed between the valve plunger and the control housing partly enclosing the valve plunger. The sleeve is provided with a collar or shoulder which, in the releasing position, is in abutment with a front face of the control housing. The sleeve is provided with another stop means or circular face cooperating with a shoulder of the valve plunger to displace the sleeve in the direction of operation.

Preferably the front face of the piston facing the booster casing is provided with a recess or depression into which is inserted a resilient reaction disc. The valve plunger and the head of the control housing or the sleeve enclosing the valve plunger, in the event of a failure of the primary brake circuit, plunges into the recess or depression.

To permit a pressure build-up in the master cylinder, the sleeve is provided with a shoulder in cooperation with a ring valve at least partly enclosing the sleeve. The ring valve, in the braking position, will close the intake port for the piston chamber into which the sleeve will immerse in the braking position. Pressure is applied to the ring valve in the closing direction by a compression spring.

The master cylinder will usually be closed by an annular lid on the end thereof facing the booster casing. The casing shell of the booster casing forming the vacuum chamber is clamped between the lid and the open end of the master cylinder. The longitudinally displaceable control housing is sealingly guided through the central hole of the ring-shaped lid.

To insure easy displaceability of the sleeve, the sleeve is guided in a longitudinal bore of the control housing with the longitudinal bore of the sleeve formed as a step bore. The master cylinder-sided end of the valve plunger is guided in the small step of the longitudinal bore. The sleeve forming a stop means cooperates with the valve plunger to define the path of displacement of the valve plunger relative to the sleeve.

The longitudinal bore in the control housing for supporting and guiding the valve plunger is usually in the form of a step bore. The master cylinder-sided end of the valve plunger is disposed in the small step. An annular groove is provided in the small step, which step is in conjuncton with a stop ring held on the valve plunger to define the longitudinal movement of the valve plunger over the control housing.

Preferably, the master cylinder-sided end of the control housing is in the form of the master cylinder piston and has a sealing ring or primary cup in cooperation with an annular groove cut behind the primary cup into the cylindrical surface of the part of the control housing plunging into the piston chamber. The annular groove, in the releasing position, corresponds to the intake port of one of the brake circuits.

According to a preferred form of the invention, a compression spring is provided between the valve plunger and the control housing to enclose the valve plunger. The spring applies pressure to the valve plunger in the direction opposite the direction of operation.

In particular, the present invention provides a vacuum brake force booster, comprising a movable wall sealed against the booster casing and acting upon a control housing and a piston rod coupled to a brake pedal for operating a dual valve permitting the selective connection of a work chamber of the brake force booster to vacuum or a higher differential pressure, with the dual valve including a valve plunger axially displaceable in the control housing and a master cylinder connected to the booster casing for two brake circuits and an intermediate piston, wherein the valve plunger coupled to the push rod and the control housing or a sleeve cooperating with the control housing are sealingly passed through a wall of the master cylinder and, in the braking position, with the ends thereof facing away from the push rod, enter the piston chamber of the master cylinder.

DESCRIPTION OF THE PREFERRED EMBODIMENT

Figure 1:
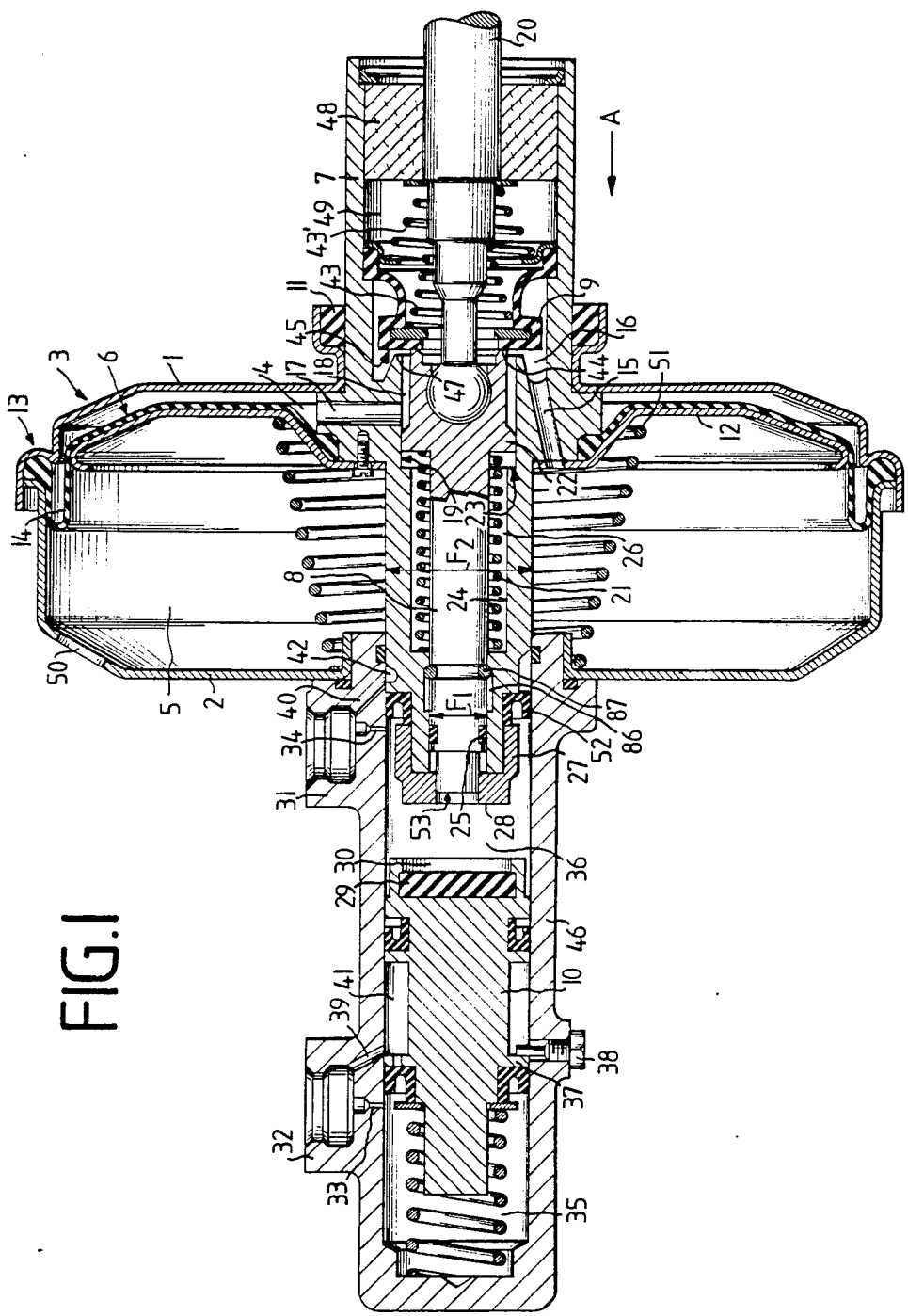
FIG. 1 shows the longitudinal section through a brake force booster with a tandem master cylinder flanged thereto.

The brake force booster according to FIG. 1 of the drawings essentially comprises booster casing 3 composed of two casing shells 1, 2, movable wall 6 subdividing vacuum housing 1 into a work chamber 4 and a vacuum chamber 5, control housing 7 held and guided in booster casing 3, control piston 8 longitudinally displaceable in control housing 7, poppet valve 9 and master cylinder 46 flanged to casing shell 2, with piston 10.

Control housing 7 with the aid of a sealing ring 11 is sealed against casing shell 1 and is movable in the direction of arrow A along with diaphragm plate 12 and rolling diaphragm 14 which is clamped at 13 between the two casing sheels 1, 2. Provided in control housing 7 is a passageway 15 connecting vacuum chamber 5 to annular space 16 ahead of poppet valve 9. A second passageway 17 connects annular space 18 provided between control piston 8 and longitudinal bore 19 in control housing 7 to the work chamber. Control piston 8, with the aid of a push rod 20 pivoted to the brake pedal (not shown in any closer detail), is displaceable against the force of a compression spring 21 in the longitudinal direction of control housing 8 to an extent until flange 22 is in abutment with shoulder 23 of the longitudinal bore 24. The end of control piston 8 facing master cylinder 46 includes a seal 25 sealing control piston 8 against annular chamber 26 formed between control piston 8 and longitudinal bore 24.

The end of control piston 8 facing master cylinder 46 is provided with a head portion 27 having a planar front face 28 the dimension of which permits contact thereof with the rubber reaction disc 29 disposed in a recess 30 at the end of the floatingly disposed piston 10 facing control piston 8.

Master cylinder 46 includes two pressure fluid intake nozzles 31, 32 respectively connected via compensating ports 33, 34 to corresponding piston chambers 35 and 36, respectively. Piston 10 is provided with a shoulder 37 which, in the brake releasing position, is in abutment with stop screw 38. In addition to compensating ports 33, 34, intake ports 39, 40 are provided, with intake port 39 terminating in an annular chamber 41 formed in piston 10. Intake port 40 establishes the connection between annular groove 42 in control housing 7 via the pressure fluid intake nozzles and the inner space of the supply tank (not shown).

The method of operation of the afore-described brake force booster will now be described. If at the beginning of a braking operation push rod 20 is displaced in the direction of arrow A against the force of release spring 43, 43', control piston 8 will simultaneously displace. Valve seat 44 provided on the brake pedal-sided end of control piston 8 will be lifted from the front face 45 of the poppet valve 9 as front face 45 of poppet valve 9 is in abutment with valve seat 47 of control housing 7. This prevents a sequential movement of poppet valve 9. Accordingly, air can enter from the atmosphere into the work chamber via filter 48, ambient air chamber 49, annular chamber 18 and second passageway 17. As vacuum chamber 5 via nozzle 50 is permanently in communication with a vacuum source, after the entry of atmospheric air into the work chamber 4, a pressure difference will arise between the two chambers 4 and 5. Movable wall 6 will move against the force of spring 51 in the direction of arrow A to displace control housing 7 resulting in a pressure build-up in piston chambers 35, 36. The entire cross-sectional area F2 of the master cylinder-sided part of control housing 7, as the piston area, will act on the pressure fluid column provided in piston chamber 36. If there is no further displacement of push rod 20 in the direction of the arrow, the front face 45 of poppet valve 9 will place itself on the valve seat on the control piston thereby discontinuing further in flow of air from the atmosphere into work chamber 4. Now, if no pressure is any longer applied to push rod 20, both control piston 8 and control housing 7 along with the movable wall 6 will slide back into their starting positions (releasing positions) as shown in FIG. 1. Front face 45 of poppet valve 9 will lift from valve seat 47 of control housing 7 thereby opening the connection of work chamber 4 to vacuum chamber 5 via annular chamber 16 and passageway 15. In the spot-type applied position, after sweeping of primary cup 52 over compensating portion 34, the pressure building up in master cylinder 46, via cross-sectional area F1, will exert a reaction force on push rod 20 thereby displacing the latter to the right and causing valve plunger 8 with seat 44 thereof to be sealingly seated on poppet valve 9, hence, closing the outer passageway and causing the valve plunger to take a so-called stand-by position.

In the event of a failure of the brake circuit connected to piston chamber 36, upon application of a braking force, control housing 7 and valve plunger 8 will move in the direction of arrow A until head 27 with the front face 28 thereof strikes rubber reaction disc 29. As soon as a pressure has built up in the brake circuit connected to piston chamber 35, rubber reaction disc 29 will cause a reaction force to be exerted on the front face 53 of valve plunger 8 to displace the same to the right in a direction opposite the direction of arrow A thereby attaining the afore-described stand-by position.

Figure 2:
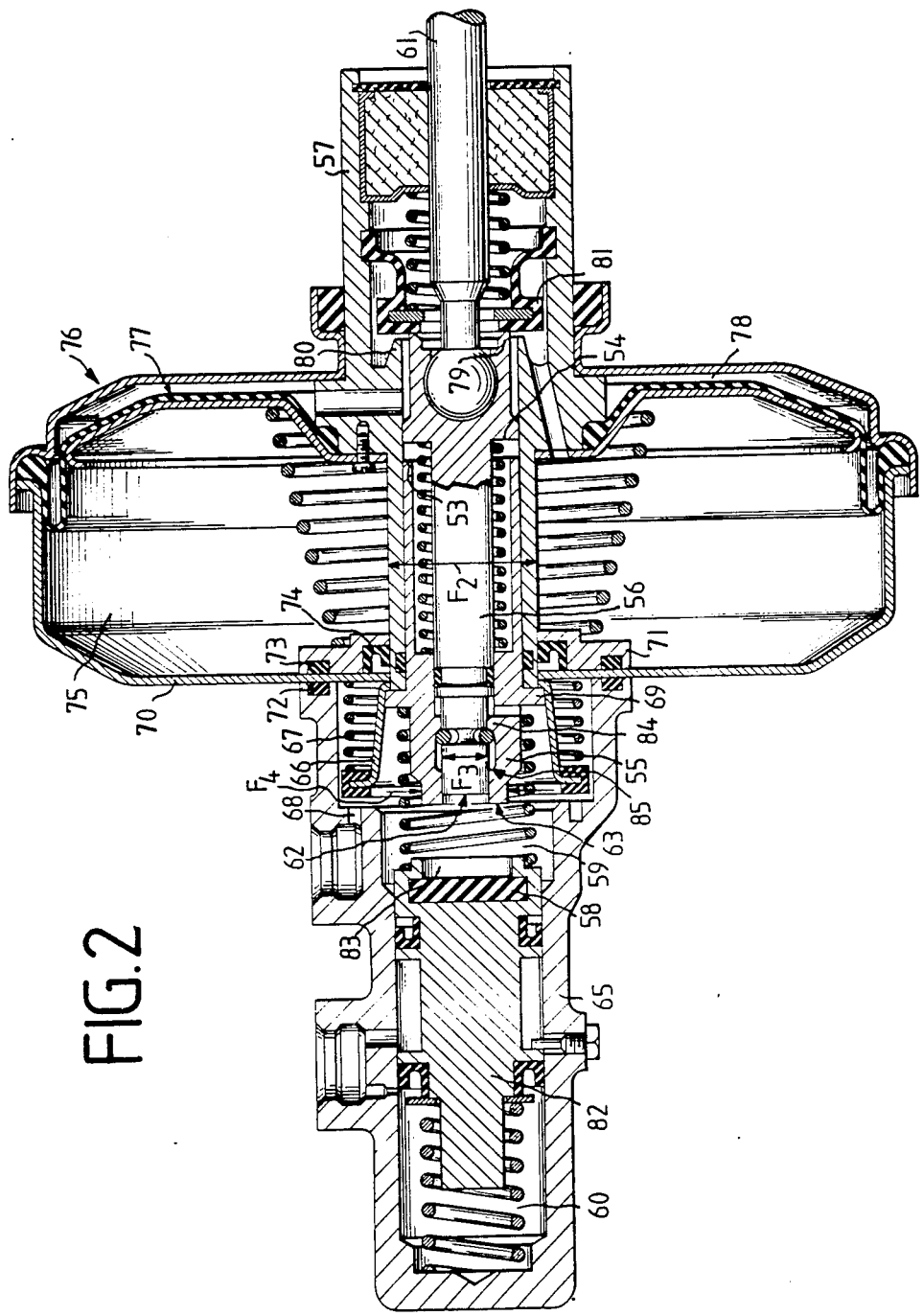
FIG. 2 shows a brake force booster with transmission step and master cylinder flanged thereto in longitudinal section.

The embodiment of the brake force booster shown in FIG. 2 is distinguished from the one shown in FIG. 1 substantially in that a sleeve 55 is longitudinally displaceable between the control housing 57 and the valve plunger to cause a hydraulic stepped transmission function. Upon operation of the brake pedal, at first only valve plunger 56 will be displaced to the left. As soon as the boosting force starts to become effective, area F2 will act on the pressure fluid columns in the piston chambers 59, 60. The pressure prevailing in piston chamber 59 will cause a reaction force to be exerted on valve piston 56 and, hence, on push rod 61, with the cross-sectional area F3 of valve piston 56 being effective. In case of a failure of the brake circuit connected to piston chamber 59, valve piston 56 will displace sleeve 55 since shoulder 54 will get into abutment with annular surface 53 thereby causing valve plunger 56 to entrain sleeve 55. As soon as front faces 62 and 63 are in contact with rubber reaction disc 58 thereby displacing piston 82 to such an extent that a pressure has built up in piston chamber 60, the rubber reaction disc 58 will generate a reaction force displacing push rod 61, sleeve 51 and valve plunger 56 to the right.

In the brake force booster as shown in FIG. 2, the surface acted upon by the reaction forces, hence, are different in size.

The reaction force generated by the pressure fluid column active in the piston chamber 59 acts on surface F3 whereas the reaction force generated by the rubber reaction disc acts upon surface F4.

In the brake force booster shown in FIG. 1, a primary cup 52 seals the compensating port 34 in the case of a braking operation to separate the pressure fluid column in the piston chamber 36 from the supply tank. In the booster of FIG. 2, the control housing 57 with valve plunger 56 and sleeve 55 acts as a plunger piston upon cross-sectional area F2. Master cylinder 65, for that purpose, is provided with a ring valve 66 forced by a compression spring 67, in the braking position, against the intake port 68 and, in the releasing position, is drawn by shoulder 69 of sleeve 55 against the force of compression spring 67 to the right to such an extent that the opening of the intake port 68 is open to thereby establish the connection between the supply tank and piston chamber 59. Master cylinder 65 flanged to casing shell 70, with the aid of lid 71 disposed on the inner side of casing shell 70, will be closed, with lid 71 and master cylinder 65 being screwed together thereby enclosing between themselves the radially inner part of casing shell 70. Packings 72, 73 provide for the required sealing between casing shell 70 and lid 71 on the other hand. Another ring packing 74 enclosed the control housing at the end thereof facing master cylinder 65 to provide for a pressure-proof separation of the vacuum chamber 75 from the piston chamber 59.

The essential advantages of the afore-described brake force booster reside in that the conventional rubber reaction disc (with the intact brake force booster) has been replaced by the brake fluid contained in the piston chambers 36 and 59, respectively, thereby rendering the device less temperature-dependent. Upon operation of the brake pedal connected to push rod 20 and 61, respectively, closure of the compensating ports 33, 34 is caused to immediately activate the booster. In the event of a failure of the booster, the pedal force will act upon a reduced piston area offering substantial advantages to the design of the brake system.

In the event of a failure of the brake force booster of FIG. 2, it will not be the cross-sectional area F2 of the control housing 57 that will act on the pressure fluid column contained in piston chamber 59, but rather the cross-sectional area of sleeve 55, because control housing 57 is held in the position as shown in FIG. 2 by the piston return spring acting upon movable wall 77. As a result of the reduced effective cross-sectional area, in the event of a failure of the booster, consequence that the pedal force required for deacceleration is reduced.

What is claimed is:

1. A combination vacuum brake booster and master cylinder comprising:
    a booster casing;
    a moveable wall sealingly subdividing said casing into a low pressure chamber and a working chamber;
    a dual valve including a control valve housing affixed to said moveable wall and mounted to said casing for movement with said wall, said control valve housing having a longitudinal bore;
    a poppet valve mounted in said longitudinal bore;
    a plunger sealingly, slidably mounted in said bore connected to a pedal operated push rod, said plunger including means cooperating with said poppet valve for selectively connecting said working chamber to a vacuum and a higher differential pressure in response to movement of said push rod, an end of said plunger being exposed at an end of said control valve housing;
    a master cylinder housing affixed to said booster casing and having a bore closed at one, open at a second end, said end of said control valve housing slidably sealingly received in said open end of said master cylinder bore;
    a single free floating master cylinder piston in said master cylinder bore including a rubber reaction member at a first end of said piston facing and being normally spaced apart from said end of said control valve housing, said first end of said master cylinder piston and said end of said control valve housing and said exposed end of said plunger defining a first master cylinder pressure chamber and said closed end of said master cylinder bore and a second end of said master cylinder piston defining a second master cylinder pressure chamber, said end of said control valve housing and said exposed end of said plunger abutting said reaction member upon loss of pressure in said first master cylinder pressure chamber.

2. The combination vacuum brake booster and master cylinder of claim 1 wherein said end of said control valve housing in said bore of said master cylinder includes a primary cup defining a pressure piston operating in said first pressure chamber.

3. The combination vacuum brake booster and master cylinder of claim 11 further including a sleeve disposed in the control housing bore between the valve plunger and control housing, said sleeve being longitudingly displaceable in the control housing bore, the sleeve partly enclosing the valve plunger and including a collar which in a brake released position is in abutment with the end of the control housing, said sleeve including an annular surface at one end cooperating with a shoulder on the valve plunger to displace the sleeve in a brake actuated direction.

4. The combination vacuum brake booster and master cylinder of claim 11 wherein the first end of the master cylinder piston includes a recess into which is inserted the rubber reaction member.

5. The combination vacuum brake and master cylinder of claim 3 wherein the collar on the sleeve cooperates with a ring valve at least partially enclosing the sleeve, said ring valve in the actuated position closes an intake bore to the first pressure chamber.

6. The combination vacuum brake and master cylinder of claim 11 wherein the master cylinder is attached to said booster casing by a ring-shaped lid at the open end thereof within the booster casing, with a portion of the booster casing clamped between the lid and the open end of the master cylinder housing, the longitudinally displaceable control valve housing sealingly extending through a central hole in the ring-shaped lid.

7. The combination vacuum brake and master cylinder of claim 3 wherein the sleeve is guided in said longitudinal bore of the control valve housing, and includes a stepped bore and the valve plunger being guided in a small diameter section of the stepped bore, the sleeve being provided with stops cooperating with the valve plunger to define the displacement of the valve plunger relative to the sleeve.

* * * * *